United States Patent [19]

Conciatori et al.

[11] 4,031,063

[45] June 21, 1977

[54] POLYESTER RESIN COMPOSITIONS

[75] Inventors: Anthony B. Conciatori, Chatham; Robert W. Stackman, Morristown, both of N.J.

[73] Assignee: Celanese Corporation, New York, N.Y.

[22] Filed: Mar. 17, 1975

[21] Appl. No.: 558,748

[52] U.S. Cl. .............................. 260/860; 260/47 C; 260/49; 260/75 R; 260/75 H

[51] Int. Cl.² ................ C08G 63/18; C08G 63/26; C08G 63/60; C08G 63/68

[58] Field of Search ......... 260/860, 47 C, 49, 75 R, 260/75 H

[56] References Cited

UNITED STATES PATENTS

| | | | |
|---|---|---|---|
| 3,008,933 | 11/1961 | Wielicki et al. | 260/75 R |
| 3,043,799 | 7/1962 | Thiebaut et al. | 260/75 R |
| 3,043,806 | 7/1962 | Caldwell | 260/75 R |
| 3,043,808 | 7/1962 | Hagemeyer | 260/75 R |
| 3,278,640 | 10/1966 | Goldberg et al. | 260/75 R |
| 3,285,956 | 11/1966 | Holsten et al. | 260/75 R |
| 3,296,211 | 1/1967 | Winkler et al. | 260/75 R |
| 3,311,578 | 3/1967 | Laakso | 260/75 R |
| 3,320,079 | 5/1967 | Perry et al. | 260/75 R |
| 3,341,500 | 9/1967 | Schwarz | 260/75 R |
| 3,440,221 | 4/1969 | Quisenberry | 260/75 R |
| 3,511,809 | 5/1970 | Hogsed et al. | 260/75 R |
| 3,651,014 | 3/1972 | Witsiepe | 260/75 R |
| 3,678,102 | 7/1972 | Isard et al. | 260/75 R |
| 3,884,990 | 5/1975 | Sakata et al. | 260/47 C |

OTHER PUBLICATIONS

Polyesters — vol. 1, Saturated Polymers by Goodman and RHYS, (1965).

Primary Examiner—V. P. Hoke

[57] ABSTRACT

This invention relates to high molecular weight polyester resin compositions which are uniquely stable under hydrolytic conditions. The polyester resin compositions are produced by the condensation of a dihydric polyol with a sterically-hindered neo-acid derivative such as $\alpha,\alpha,\alpha',\alpha'$-tetramethyl-p-phenylenediacetic acid.

3 Claims, No Drawings

POLYESTER RESIN COMPOSITIONS

BACKGROUND OF THE INVENTION

Thermoplastic polyester resin compositions have found wide commercial acceptance because they can be formed into strong abrasion-resistant fibers, films and molded articles. Those skilled in the art have endeavored to develop new types of polyester resins which have improved tensile strength, stiffness, elongation, impact strength, flame resistance, thermal and chemical resistance, and the like. Wholly aromatic polyester resins exhibit improved thermal and chemical stability, but they have exceedingly high melt viscosities and require high processing and fabrication temperatures for injection moldings or melt extrusion into films, fibers or other shaped articles.

Polyester resin compositions tend to be highly susceptible to hydrolytic conditions and corrosive environments. The carbonyloxy moieties in polyester resin compositions are highly reactive and readily enter into chemical transformations. For example, in the production of segmented polyester resins, it is a disadvantage that transesterification occurs between prepolymer reactants, and the resultant polyester resin has a random configuration rather than the desired segmented copolymer structure.

Accordingly, it is an object of the present invention to provide polyester resin compositions which have improved thermal and chemical stability.

It is another object of this invention to provide high molecular weight polyester resin compositions which are soluble in solvents and can be conveniently converted into films and molded articles.

It is another object of this invention to provide polyester resins which are hydrolytically stable and adapted for injection moldings or melt extrusion into flame resistant fibers and other shaped articles.

It is a further object of the present invention to provide a method for producing segmented polyester resin copolymers wherein random transesterifications between prepolymer reactants is suppressed.

Other objects and advantages shall become apparent from the following description and examples.

DESCRIPTION OF THE INVENTION

One or more objects of the present invention are accomplished by the provision of thermally and chemically stable polyester resin compositions comprising substantially the recurring structural unit:

wherein R is a divalent organic radical containing between 1 and about 20 carbon atoms; and A is selected from the radicals

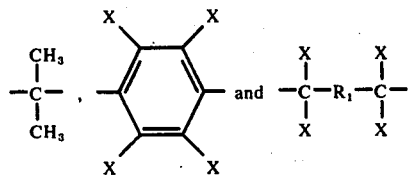

wherein $R_1$ is a single bond or a divalent aliphatic radical containing between 1 and about 12 carbon atoms; and X is selected from methyl and halogen.

The R substituent is preferably a divalent aliphatic or aromatic radical containing between 1 and about 12 carbon atoms, and is most preferably an alkylene group containing between 1 and about 10 carbon atoms.

The $R_1$ substituent is preferably a single bond or an alkylene group containing between 1 and about 10 carbon atoms.

The X substituent is preferably selected from methyl, chlorine, fluorine or bromine, and is most preferably either methyl or chlorine.

The novel polyester resin compositions of the present invention are produced by the condensation of a diol and a sterically-hindered neo-acid derivative which are selected to provide the recurring structural moieties represented in the general formula described hereinabove.

Illustrative of the preferred neo-acid derivatives which can be employed in the production of the invention polyester resins are the following structures:

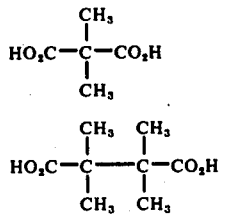
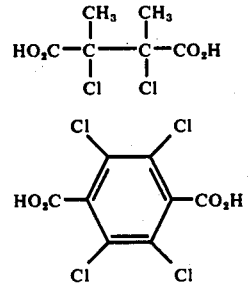
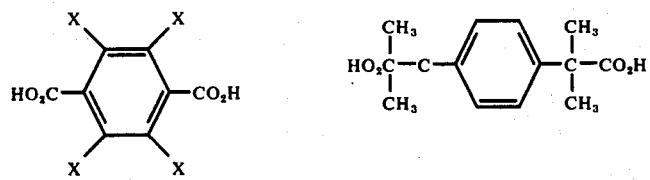

It is known in the art that neo-acid derivatives can be prepared by the addition of carbon monoxide to olefins in the presence of catalysts. For example, the reaction of isobutylene with carbon monoxide in the presence of hydrogen ions results in the formation of neo-pentanoic acids. This synthetic method can also be employed to produce neo-dicarboxylic acids.

Neo-acids can also be produced by other synthesis methods. For example, p-phenylene bis(dimethylacetic acid) may be obtained by the two-step hydrolysis of the corresponding dinitrile wherein the first step is carried out at a temperature of 90° to 125° C. in the presence of phosphoric acid and the second step is conducted by heating this intermediate at reflux with an alkali metal hydroxide. This process is fully described in U.S. Pat. No. 3,285,956. In addition, acids of the following formula:

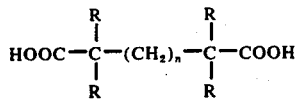

wherein R is alkyl and $n$ is an integer of 1 to 10, may be prepared by a multi-step synthesis involving reacting a 2,2-dialkylacetyl halide with an alkali metal salt of trialkylcarbinol in the presence of liquid ammonia to form a trialkylcarbinyl-2,2-dialkylacetate, reacting this material with metallic sodium in liquid ammonia to give the sodium salt of the trialkylcarbinyl-2,2-dialkylacetate, reacting the latter material with an alkylene dihalide and hydrolyzing the resultant product to produce the 2,2,8,8-tetraalkyl substituted acid. This synthesis is more fully described in U.S. Pat. No. 3,210,404.

In a further procedure for preparing starting materials for use in this invention, diacids of the formula:

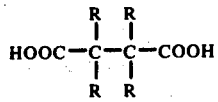

wherein R is alkyl or halogen, may be prepared by the reaction of a compound of the formula:

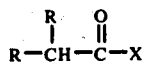

wherein X is hydroxyl, halogen or an alkoxy group, with acetyl peroxide wherein the reactants are mixed at about 0° C. and thereafter heated at temperatures up to about 70°–100° C. This synthesis is fully described in U.S. Pat. No. 2,426,224.

The dihydric polyol reactant which is condensed with the neo-acid to produce polyester resin compositions is selected from aliphatic, alicyclic and aromatic diols. Illustrative of suitable diols are ethylene glycol; diethylene glycol; 1,2-propylene glycol; 2,4-dimethyl-2-ethylhexane-1,3-diol; 2,2,4-trimethyl-1,3-pentanediol; 2,2-dimethyl-1,3-propanediol; 2-ethyl-2-butyl-1,3-propanediol; 2,2-diethyl-1,3-propanediol; 2-methyl-2-propyl-1,3-propanediol; 3-ethyl-2-isobutyl-1,3-propanediol; 1,3-butanediol; 1,4-butanediol; 1,4-butenediol; 1,5-pentanediol; 1,6-hexanediol; 1,10-decanediol; 2,2,4-trimethyl-1,6-hexanediol; 1,4-cyclohexanediol; 1,2-cyclohexanedimethanol; 1,3-cyclohexanedimethanol; 1,4-cyclohexanedimethanol; 2,2,4,4-tetramethyl-1,3-cyclobutanediol; hydroquinone; resorcinol; 1,4-naphthalenediol; catechol; 4,4'-isopropylidenediphenol (i.e., Bisphenol A); 4,4'-sulfonyl fiphenol; 4,4'-thiodiphenol; 4,4'-oxydiphenol; 4,4'-dihydroxybiphenyl; 4,4'-sulfonylbis(2,6-dibromophenol); 4,4'-(2-norbornylidene)diphenol; 2,6-naphthalenediol; 4,4'-isopropylidenebis(2,6-dichlorophenol); and other dihydric phenols listed in U.S. Pat. No. 3,030,355, 3,317,466 and 3,454,672.

In most cases conventional methods for producing polyester resins can be employed to provide the present invention polyester resin compositions. The effect of the sterically-hindered structure of the neo-diacid employed as a reactant causes the condensation of the neo-diacid with the diol to proceed more slowly and with greater difficulty than in the case of the average type acid-diol condensation reaction. For this reason it is preferred to react the neo-diacid in the form of an acid chloride derivative.

Polyester resin compositions can be prepared from a neo-acid chloride and diol by heating and condensing equimolar quantities of reactants in a suitable high boiling solvent such as chlorinated biphenyl, as described in U.S. Pat. No. 3,036,990.

The polyester resin composition can also be prepared by the interfacial polycondensation of a neo-acid chloride and a diol such as resorcinol in an aqueous alkaline medium as described in U.S. Pat. No. 3,216,970. Another method of preparing the polyester resin composition is by heating together the neo-acid reactant with a monocarboxylic acid ester derivative of the diol reactant (e.g. hydroquinone diacetate as disclosed in U.S. Pat. No. 3,317,464).

Another method of polyester resin preparation is by ester exchange of neo-acid alkyl ester and diol as described in U.S. Pat. No. 3,220,977. Because of the sterically-hindered structure and lower reactivity of the neo-acid reactant, the preparation of the present invention polyester resin composition by ester-exchange condensation normally requires a higher reaction temperature and other more vigorous reaction conditions than reported in the chemical literature of conventional polyester resins.

In a typical preparation of polyester resin composition, neo-acid chloride and diol are heated at reflux in a catalyzed solution.

Aromatic hydrocarbons and halogenated aromatic hydrocarbons are solvents which may be employed in the process of the invention, including benzene, toluene, o-xylene, m-xylene, p-xylene, p-cymene, diphenylmethane, 1,3,5-triethylbenzene, chlorobenzene, o-dichlorobenzene, 1,2,4-trichlorobenzene, and the like. In general, the use of higher boiling solvents will result in the formation of higher molecular weight polymers.

The reactants can be heated in the absence of a catalyst, but the presence of a metal catalyst increases the rate of reaction. Particularly outstanding results are obtained using powdered magnesium as the catalyst.

The time required for the formation of high molecular weight polyester will vary depending upon the temperature of the reaction, the purity of the reactants and the choice of catalysts. The reactants and the solvent must be essentially free from impurities and water which cause degradative side reactions and chain termination and prevent the formation of high molecular weight polymer. Increasing the time of reaction increases the molecular weight of the resulting polymer with accompanying increases in glass transition temperature, flow temperature, and decomposition temperature.

The polymer product can be isolated in any convenient manner such as will be known to one skilled in the art. One convenient method is to filter off the catalyst and pour the reaction mixture into a nonsolvent for the polymer. The precipitated polymer can be further purified by washing and drying to remove solvent.

A particularly important embodiment of the present invention is the provision of a process for producing novel resinous linear segmented polyester copolymers which are characterized by improved properties such as thermal stability, excellent resistance to corrosive and hydrolytic environments, resistance to degradation by high energy particle and gamma ray radiation, low flammability, high tensile modulus, and a melting point above about 300° C.

The segmented polyester copolymers of the present invention are prepared by condensing two or more prepolymer compositions, one of which corresponds to the general formula:

wherein R and A are organic radicals as defined hereinabove, and n is an integer between about 10 and 100.

The preferred segmented polyester copolymers are those in which the two or more prepolymer compositions which are condensed have different structural configurations but all corresponding to the above defined general formula. These preferred segmented polyester copolymers have an excellent combination of desirable properties. This is attributable to the unique steric structure of the condensed prepolymer moieties. Little or no random transesterification occurs during the process of condensation polymerization of the prepolymers. This relates to the inhibited reactivity of the carbonyloxy linkages in the prepolymer compositions which is a steric hindrance phenomenon. The suppression of transesterification equilibrium reactivity eliminates undesirable random copolymerization. This has the important advantage of providing a means of custom synthesizing segmented copolymers with precisely defined properties.

In one method of producing the preferred segmented polyester copolymer compositions of the present invention, a prepolymer is prepared by condensing a diol such as ethylene glycol with an excess of a neo-dicarboxylic acid such as α, α, α', α'-tetramethyl-p-phenylenediacetic acid chloride. A second prepolymer is prepared by condensing an excess of diol such as hexanediol with a neo-carboxylic acid such as tetrachloroterephthalic acid chloride. The two prepolymers are blended together in a solvent such as chloroform, and subjected to copolymerization reaction conditions to yield a segmented polyester copolymer having an inherent viscosity above about 0.4, and a melting point above about 300° C.

It is advantageous to stabilize the present invention polyester resin composition to thermal and radiation effects by the incorporation of stabilizers. Suitable stabilizers include phenols and their derivatives, amines and their derivatives, compounds containing both hydroxyl and amine groups, hydroxyazines, oximes, polymeric phenolic esters and salts of multivalent metals in which the metal is in its lower valence state.

Representative phenol derivatives useful as stabilizers include 4,4'-bis(2,6-ditertiary-butylphenol), 1,3,5-trimethyl-2,4,6-tris[3,5-ditertiary-butyl-4-hydroxybenzyl]benzene and 4,4'-butylidene-bis(6-tertiary-butyl-m-cresol). Various inorganic metal salts or hydroxides can be used as well as organic complexes such as nickel dibutyl dithiocarbamate, manganous salicylate and copper 3-phenyl-salicylate. Typical amine stabilizers include N,N'-bis(beta-naphthyl)-p-phenylenediamine, N,N'-bis(1-methyl-heptyl)-p-phenylenediamine and either phenyl-betanaphthyl amine or its reaction products with aldehydes. Mixtures of hindered phenols with esters of thiodipropionic acid, mercaptides, and phosphite esters are particularly useful. Additional stabilization to ultraviolet light can be obtained by compounding with various UV absorbers such as substituted benzophenones or benzotriazoles.

The properties of these copolyesters can be modified by incorporation of various conventional inorganic fillers such as carbon black, silica gel, alumina, clays, and chopped fiber glass. In general, these additives have the effect of increasing the modulus of the material at various elongations.

Some of the polyester resin compositions of the present invention have high melting and decomposition temperatures which make them useful as high temperature coatings, films and molded articles.

Some of the polyester resin compositions of the present invention have low melt viscosity, good flow and mold melting characteristics, insensitivity to moisture, and can be processed by procedures employed for thermoplastics in general. The polyester resin compositions can be extruded to produce films, and tubing, and cross-heat extruded for hose, wire, cable and other substrate coverings. The polyester resin compositions can be melt spun to form fibers and filaments, and can be readily calendered to produce sheeting or to produce calender-coat woven and non-woven fabrics and other materials.

The following examples are further illustrative of the present invention. The reactants and other specific ingredients are presented as being typical, and various modifications can be devised in view of the foregoing disclosure within the scope of the invention.

EXAMPLE 1

Preparation of α, α, α', α'-Tetramethyl-p-phenylenediacetyl Chloride

To a 250 ml. three-necked flask equipped with stirrer, reflux condenser with drying tube, and nitrogen inlet is added 10 grams α, α, α', α'-tetramethyl-p-phenylenediacetic acid and 50 grams thionyl chloride. The mixture is heated at reflux for a period of eight hours. The excess thionyl chloride is removed by distillation and the residue is distilled under reduced pressure to yield α, α, α', α'-tetramethyl-p-phenylenediacetyl chloride, B.P. 135° C. at 5 mm Hg. pressure.

EXAMPLE 2

Preparation of Polyester From Bisphenol A And α, α, α', α'-Tetramethyl-p-phenylenediacetyl Chloride To a 100 ml. three-necked flask equipped with stirrer, nitrogen inlet, condenser and dropping funnel is added 5.85 grams Bisphenol A, 6.3 grams triethylamine and 25 ml. methylene chloride. The mixture is stirred, and a solution of seven grams of α, α, α', α'-tetramethyl-p-phenylenediacetyl chloride in 25 ml. methylene chloride is added dropwise over a half hour period. The mixture is then refluxed for 5 hours.

The product mixture is cooled to room temperature, extracted twice with 50 ml. of a 1% hydrochloric acid solution, and three times with 50 ml. distilled water. The polymer is recovered by addition of the reaction mixture to rapidly agitated methanol. The polymer is washed once with methanol and dried in a forced air oven at 40° C. The polymer has an inherent viscosity of 0.6 dl/g (measured as a 0.4% solution in tetrachloroethane at 25° C) and a melting point of 200°–205° C.

EXAMPLE 3

Preparation Of Hydroxyl-terminated Polyester From α, α,α', α'-Tetramethyl-p-phenylenediacetyl Chloride And Ethylene Glycol To a 100 ml. three-necked flask equipped with a nitrogen inlet tube, stirrer and exit tube is added 108.5 grams (0.5 mole) α, α, α', α'-tetramethyl-p-phenylenediacetyl chloride and 37.2 grams (0.6 mole) ethylene glycol. The mixture is stirred rapidly as the exothermic reaction evolves hydrogen chloride. As the mixture becomes solid, heat is applied in order to keep the reaction mixture liquid. The temperature is held at about 150° C. until the hydrogen chloride evolution is complete (two hours). At the end of this period the reaction mixture is cooled and a hard white solid is recovered which is hydroxyl-terminated poly(ethylene-α, α, α', α'-tetramethyl-p-phenylenediacetate).

EXAMPLE 4

Preparation Of α, α, α', α'-Tetramethylpimelic Acid a. Preparation Of 2,6-dimethyl-2,6-dichloroheptane To a 500 ml. three-necked flask equipped with gas inlet tube, stirrer and reflux condenser, is added 124 grams of 2,6-dimethyl-1,6-heptadiene (1.0 mole). Through the addition tube is added slowly 75 grams of gaseous hydrogen chloride. The reaction mixture is cooled during the course of the addition. At the end of the hydrogen chloride addition (3 hours) the mixture is heated to 100° C. and a nitrogen sweep is maintained for 2 hours to remove excess hydrogen chloride.

b. Preparation Of α, α, α', α'-tetramethylpimelic acid

To a 5-liter three-necked flask equipped with stirrer, reflux condenser and addition funnel is charged 2000 ml. anhydrous ether and 55 grams magnesium turnings. A small amount (5 ml.) of the 2,6-dimethyl-2,6-dichloroheptane is added and the mixture stirred until refluxing begins. The reaction is cooled by means of an ice bath, and the remainder of the 2,6-dimethyl-2,6-dichloroheptane prepared above is added dropwise over a three hour period.

At the end of this period the mixture is stirred for 1 hour, then the reaction mixture is poured into a beaker containing about 500 grams of crushed dry ice ($CO_2$). When the mixture is warmed to room temperature the ether is allowed to evaporate and the residue is treated with 1000 ml. of a 35% hydrochloric acid solution to free the desired acid. The product is recrystallized twice from ether to yield a white solid, M.P. 168°–168.5° C.

c. Preparation Of α, α, α', α'-tetramethylpimeloyl chloride

To a 500 ml. one-necked flask is added 100 grams α, α, α', α'-tetramethylpimelic acid and 250 grams thionyl chloride. The mixture is refluxed for four hours during which time hydrogen chloride and sulfur dioxide are evolved. At the end of this period the excess thionyl chloride is removed by distillation and the residue recrystallized twice from cyclohexane to yield pure α, α, α', α'-tetramethylpimeloyl chloride.

EXAMPLE 5

Preparation Of Acid Chloride-terminated Polyester From α, α, α', α'-Tetramethylpimeloyl Chloride And 1,12-Dodecanediol To a 250 ml. three-necked flask equipped with a nitrogen inlet tube, stirrer and exit tube is added 151.8 grams (0.6 mole) α, α, α', α'-tetramethylpimeloyl chloride and 100 grams (0.5 mole) 1,12-dodecanediol. The mixture is stirred rapidly, and the temperature is slowly increased to about 120° C. in order to maintain hydrogen chloride evolution.

After the evolution of hydrogen chloride has ceased, the reaction mixture is cooled to room temperature. A pale yellow viscous material is recovered which is acid chloride-terminated poly(1,12-dodecane-α, α, α', α'-tetramethylpimelate).

EXAMPLE 6

Preparation Of Polyester Block Copolymer

The products from Example 3 [hydroxy-terminated poly(ethylene-α, α, α', α'-tetramethyl-p-phenylenediacetate)] and from Example 5 [acid chloride-terminated poly(1,12-dodecane-α, α, α', α'-tetramethylpimelate)] are mixed together and heated to a melted mixture. The temperature is slowly increased to about 250° C. while a nitrogen purge is maintained and hydrogen chloride is evolved. At the end of about 3 hours at 250° C. the hydrogen chloride evolution has ceased. The various polymer melt is cooled.

The recovered polymer is a pale yellow solid which yields flexible films when compression molded. The polyester block copolymer has an inherent viscosity of 0.64 dl/g (measured as a 0.1% solution in a mixture of 10 parts phenol and seven parts trichlorophenol).

EXAMPLE 7

Preparation of Tetramethylterephthaloyl Chloride

To a 500 ml. three-necked flask equipped with stirrer, reflux condenser and nitrogen inlet is added 100 grams tetramethylterephthalic acid and 200 ml. thionyl chloride. The mixture is stirred at reflux of 6 hours during which time the acid dissolves and a mixture of sulfur dioxide and hydrogen chloride is evolved. At the end of this period the excess thionyl chloride is removed by distillation. The crude tetramethylterephthaloyl chloride is recrystallized twice from cyclohexane.

EXAMPLE 8

Preparation Of Poly(ethylenetetramethylterephthalate)

A 100 ml. three-necked flask equipped with a nitrogen inlet, stirrer and exit tube is flushed with nitrogen and charged with 51.8 grams tetramethylterephthaloyl chloride and 10.4 grams ethylene glycol. The reaction is stirred vigorously and nitrogen is passed through the melt. As the reaction proceeds the reaction mixture begins to solidify and sufficient heat is applied to maintain a polymer melt. When the temperature of the melt has reached 275° C., a vacuum is applied and maintained at 0.5 mm Hg. for 2 hours. At the end of this period the vacuum is released and the reaction mixture allowed to cool. A white solid polymer is recovered which has an inherent viscosity of 0.6 dl/g (measured as a 0.1% solution in a 10/7 mixture of phenol and trichlorophenol).

EXAMPLE 9

Preparation Of Polyester From Sulfonyl Diphenol And Tetrachloroterephthaloyl Chloride To a 100 ml. three-necked flask equipped with stirrer, nitrogen inlet and reflux condenser is added 5.0 grams sulfonyl diphenol, 30 ml. Arachlor (chlorinated biphenyl) and 6.82 grams tetrachloroterephthaloyl chloride. The mixture is heated with stirring to 285° C. for a period of 1.5 hours during which time hydrogen chloride evolves. The mixture is cooled and added to acetone in a Waring Blender to precipitate the polymer. The polymer product is washed twice with acetone and with hexane in the blender, then dried in a forced air oven at 80° C. for 18 hours.

The polymer has an inherent viscosity of 0.53 dl/g (measured as a 0.1% solution in a 10/7 mixture of phenol and trichlorophenol).

EXAMPLE 10

Preparation Of 2,3-Dichloro-2,3-dimethylsuccinyl Chloride

To a 500 ml. three-necked flask equipped with stirrer, condenser and gas inlet tube is added 25 grams (0.2 mole) 2,3-dimethylsuccinic acid in 200 ml. carbon tetrachloride. The reaction flask is shielded from the light and 15 grams (0.21 mole) chloride gas is added through the gas addition tube. The mixture is stirred for 2 hours after the addition is complete. At the end of this period the solvent is removed under vacuum and 50 grams thionyl chloride is added. The mixture is refluxed for 8 hours, then the excess thionyl chloride is removed under vacuum. The residue is recrystallized twice from cyclohexane to yield 37 grams (59%) of 2,3-dichloro-2,3-dimethylsuccinoyl chloride.

EXAMPLE 11

Preparation Of Polyester From 4,4'-Oxydiphenol 2,3-Dichloro-2,3-dimethylsuccinoyl Chloride To a 500 ml. three-necked flask equipped with stirrer, nitrogen inlet reflux condenser and dropping funnel is added 50 grams (0.25 mole) 4,4'-oxydiphenol, 500 ml. methylene chloride and 55 grams (0.55 mole) triethylamine. To the stirred mixture is slowly added a solution of 65 grams (0.25 mole) 2,3-dichloro-2,3-dimethylsuccinoyl chloride in 200 ml. methylene chloride over a two hour period. At the end of this addition the viscous reaction mixture is stirred for one hour, extracted twice with 1% hydrochloric acid solution, and five times with 1000 ml. portions of deionized water. The polymer is precipitated by addition of the reaction mixture to a stirred acetone solution. The polyester is washed once with acetone then dried overnight in a forced air oven at 65° C. The polymer has an inherent viscosity of 0.87 dl/g (measured as a 0.1% solution in a mixture of 10 parts phenol and seven parts trichlorophenol). The polymer can be compression molded at 200° C. to yield clear, colorless films with good flexibility.

EXAMPLE 12

Preparation Of Hydroxy-terminated Polyester From Resorcinol And 2,3-Dichloro-2,3-dimethylsuccinoyl Chloride To a 1000 ml. three-necked flask equipped with stirrer, reflux condenser and addition funnel is added 66 grams (0.6 mole) resorcinol, 250 ml. methylene chloride and 135 grams triethylamine. To the agitated solution is slowly added a solution of 126 grams (0.5 mole) 2,3-dichloro-2,3-dimethylsuccinoyl chloride in 250 grams methylene chloride. When the addition is complete, the mixture is stirred for an additional one hour. The reaction mixture contains a hydroxy-terminated polyester which is substantially poly(m-phenylene-2,3-dichloro-2,3-dimethyl succinate) corresponding to the formula:

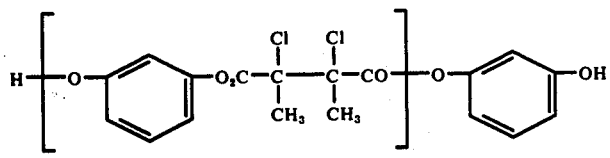

EXAMPLE 13

Preparation Of Polyester Block Copolymer

To the reaction mixture prepared in Example 12 is added 215.3 grams of the acid chloride-terminated poly(1,12-dodecane-α, α, α', α'-tetramethylpimelate) prepared in Example 5 dissolved in 250 ml. methylene chloride. The mixture is stirred for 3 hours at reflux (40° C.), then cooled, extracted three times with 500 ml. portion of a 1% hydrochloric acid solution and five times with 500 ml. portions of water. The polymer solution is poured into rapidly stirred methanol, and a white polymer precipitate is recovered and dried in a vacuum oven. The block polyester has a inherent viscosity of 0.65 dl/g (measured as a 0.1% solution in chloroform). Compression molded films are prepared which are clear and very flexible.

EXAMPLE 14

Preparation Of Poly[isopropylidene-bis(2,6-dichlorophenyl)dimethyl malonate]

To a 1000 ml. three-necked flask equipped with stirrer, reflux condenser, nitrogen inlet and dropping funnel is added 36.6 grams (0.1 mole) tetrachlorobisphenol A [isopropylidene-bis(2,6-dichlorophenol)], 25 grams triethylamine and 500 ml. methylene chloride. The mixture is stirred to dissolve the reactants and a solution of 16.9 grams (0.1 mole) dimethylmalonyl chloride in 75 ml. methylene chloride is added dropwise over a one hour period. The mixture is then refluxed for 5 hours.

The reaction mixture is cooled to room temperature, extracted three times with 200 ml. portions of a 1% hydrochloric acid solution and then five times with 250 ml. portions of distilled water. The washed polymer solution is poured into rapidly stirred acetone in a Waring Blender to precipitate the polymer. The white polymer precipitate is washed twice with acetone in the blender, isolated and dried overnight in a forced air oven at 80° C. The polymer has an inherent viscosity of 0.85 dl/g (measured as a 0.4% solution in chloroform).

What is claimed is:

1. A chemically stable polyester block copolymer containing a recurring prepolymer condensate of equimolar proportions of 1,12-dodecanediol and $\alpha, \alpha, \alpha', \alpha'$-tetramethylpimelic acid, and containing a recurring prepolymer condensate of equimolar proportions of resorcinol and 2,3-dichloro-2,3-dimethylsuccinic acid.

2. A chemically stable polyester resin composition comprising substantially equimolar proportions of 4,4'-oxydiphenol and 2,3-dichloro-2,3-dimethylsuccinic acid condensation residues.

3. A chemically stable polyester resin composition comprising substantially equimolar proportions of resorcinol and 2,3-dichloro-2,3-dimethylsuccinic acid condensation residues.

* * * * *